United States Patent
Ko

(10) Patent No.: US 7,023,696 B2
(45) Date of Patent: Apr. 4, 2006

(54) COOLING DEVICE AND ELECTRIC OR ELECTRONIC APPARATUS EMPLOYING THE SAME

(75) Inventor: Sung-soo Ko, Suwon (KR)

(73) Assignee: Samsung Electcronics Co., Ltd., Suwon-Si (KR)

(*) Notice: Subject to any disclaimer, the term of this patent is extended or adjusted under 35 U.S.C. 154(b) by 315 days.

(21) Appl. No.: 10/688,915

(22) Filed: Oct. 21, 2003

(65) Prior Publication Data

US 2004/0114325 A1    Jun. 17, 2004

(30) Foreign Application Priority Data

Nov. 21, 2002   (KR) ...................... 10-2002-0072846

(51) Int. Cl.
*H05K 7/20* (2006.01)
(52) U.S. Cl. ............... 361/695; 165/80.3; 165/80.4; 165/121; 361/690; 361/696; 454/184
(58) Field of Classification Search ............ 165/80.3, 165/80.4, 121–122; 361/694–699; 454/184
See application file for complete search history.

(56) References Cited

U.S. PATENT DOCUMENTS

| 5,497,825 | A | * | 3/1996 | Yu | 165/11.1 |
| 6,101,095 | A | * | 8/2000 | Yamaguchi | 361/720 |
| 6,113,485 | A | * | 9/2000 | Marquis et al. | 454/184 |
| 6,148,907 | A | * | 11/2000 | Cheng | 165/121 |
| 6,472,781 | B1 | * | 10/2002 | Yamamoto | 310/58 |
| 6,474,409 | B1 | * | 11/2002 | Sterner | 165/96 |
| 6,603,659 | B1 | * | 8/2003 | Kim et al. | 361/690 |

FOREIGN PATENT DOCUMENTS

| CN | 2365857 | 2/2000 |
| CN | 1378770 | 11/2002 |
| JP | 4-195085 | 7/1992 |
| JP | 7-283567 | 10/1995 |
| JP | 8-88490 | 4/1996 |
| JP | 8-255855 | 10/1996 |
| JP | 11-145660 | 5/1999 |
| JP | 2001-42435 | 2/2001 |
| KR | 2000-14739 | 7/2000 |
| KR | 20-222644 | 2/2001 |

OTHER PUBLICATIONS

An Office Action issued from the Chinese Patent Office on Apr. 11, 2005.

* cited by examiner

*Primary Examiner*—Gregory Thompson
(74) *Attorney, Agent, or Firm*—Staas & Halsey LLP

(57) ABSTRACT

A cooling device for an electric or electronic apparatus includes an inhaling member formed to draw in air and then discharge the air heated by heat generated from a component of the electric or electronic apparatus, an exhausting member communicating with the inhaling member and formed to receive the heated air discharged from the inhaling member, a fan provided adjacent to the exhausting member to forcibly draw in the air from the exhausting member, and a heat exchanger absorbing the heat from the air discharged from the fan and discharging the heat through a body casing of the electric or electronic apparatus. The cooling device for the electric or electronic apparatus has a high cooling efficiency, reduces noise, and prevents an inflow of dust.

23 Claims, 3 Drawing Sheets

COOLING DEVICE AND ELECTRIC OR ELECTRONIC APPARATUS EMPLOYING THE SAME

CROSS-REFERENCE TO RELATED APPLICATIONS

This application claims the benefit of Korean Patent Application No. 2002-72846, filed Nov. 21, 2002, in the Korean Intellectual Property Office, the disclosure of which is incorporated herein by reference.

BACKGROUND OF THE INVENTION

1. Field of the Invention

The present invention relates, in general, to a cooling device for an electric or electronic apparatus, and more particularly, to a cooling device for cooling inside air heated due to heat generated by an electronic element installed on a printed circuit board (PCB) inside a main body of a computer and the like, without discharging the inside air outside the computer.

2. Description of the Related Art

A cooling device can be applied to both electric and electronic apparatuses. In particular, the cooling device will be described with reference to a computer.

According to functional improvements of a variety of the electric or electronic apparatus, more electronic elements are positioned inside a main body of the computer. Generally, the electronic elements generate heat and may deteriorate due to the heat. In this regard, there has been a need to cool inside air of the main body of the computer.

In a case of the computer, the heat is considerably generated particularly in a central processing unit (CPU) and the like. In the computer, a heat sink of a material having a high thermal conductivity is mounted on heating elements, such as the CPU and the like, to expand a surface area generating the heat. In addition, a cooling fan is separately mounted on the heat sink.

In this case, however, the heat generated only around the CPU is dispersed by the cooling fan mounted on the heat sink, and heated air still remains inside the main body of the computer. In order to discharge inside air within the main body of the computer to an outside of the computer, a separate cooling fan has to be separately mounted on a surface of a body casing of the main body.

In this case, the heated air is discharged through the separate cooling fan mounted on the surface of the body casing. Then, outside air having a lower temperature than that of the inside air within the main body flows into the main body through a ventilating opening formed on the surface of the body casing. That is, an inside of the main body is cooled by the outside air flowing thereinto.

On the other hand, the electric or electronic apparatus, such as the computer, etc., is generally mounted on or disposed adjacent to a corner or a wall of a room. A variety of electric connections are made on a rear side of the electric or electronic apparatus. Especially, in the case of the computer, it is common that several peripheral devices are electrically connected on the rear side of the main body thereof. Because of these electrical connections, the outside air around the main body is relatively high in temperature compared with an average inside temperature of the room. Further, due to static electricity, dust accumulates on the outside or the inside of the main body.

A conventional cooling method of discharging the heated inside air to the outside of the main body and drawing new outside air into the main body using the cooling fan has the following problems.

First, there is a high possibility in that the heated air discharged out around the main body of the computer flows back into the inside of the main body through the ventilating opening formed on the main body, thereby lowering a cooling efficiency of the main body.

Second, because a plurality of cooling fans are needed to enhance the cooling efficiency, noises are increased.

Third, when surrounding air flows into the main body of the computer, the dust flows thereinto together with the surrounding air, thereby contaminating the inside of the main body and causing a malfunction of the computer.

SUMMARY OF THE INVENTION

Accordingly, it is an aspect of the present invention to provide a cooling device for an electric or electronic apparatus, which has a high cooling efficiency, reduces noises and prevents an inflow of dust into the electric or electronic apparatus.

Additional aspects and advantages of the invention will be set forth in part in the description which follows and, in part, will be obvious form the description, or may be learned by practice of the invention.

The foregoing and/or other aspects of the present invention are achieved by providing a cooling device for an electric or electronic apparatus, the cooling device including an inhaling member formed to draw air and then discharge the air heated by heat generated from a component of the electric or electronic apparatus, an exhausting member communicating with the inhaling member to receive the air from the inhaling member and then discharge the air, a fan provided adjacent to the exhausting member to forcibly draw the air from the exhausting member, and a heat exchanger absorbing the heat from the air discharged from the fan and discharging the heat through a body casing of the electric or electronic apparatus.

According to another aspect of the invention, the cooling device further includes an accommodating member formed with a seating part accommodating the fan.

According to another aspect of the invention, the heat exchanger includes a plurality of heat absorbing fins, a refrigerant filled inside the heat exchanger to make a heat exchange with the air passing through the heat absorbing fins, a heat discharging plate attached to the body casing of the electric or electronic apparatus to discharge the heat energy of the refrigerant, and a refrigerant pipe connecting the heat absorbing fins and the heat discharging plate to allow the refrigerant to circulate the heat exchanger.

According to another aspect of the present invention, an electric or electronic apparatus includes the above-described cooling device and the body casing on which the cooling device is mounted.

According to another aspect of the invention, the body casing has a closed structure closed from an outside of the body casing.

BRIEF DESCRIPTION OF THE DRAWINGS

These and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
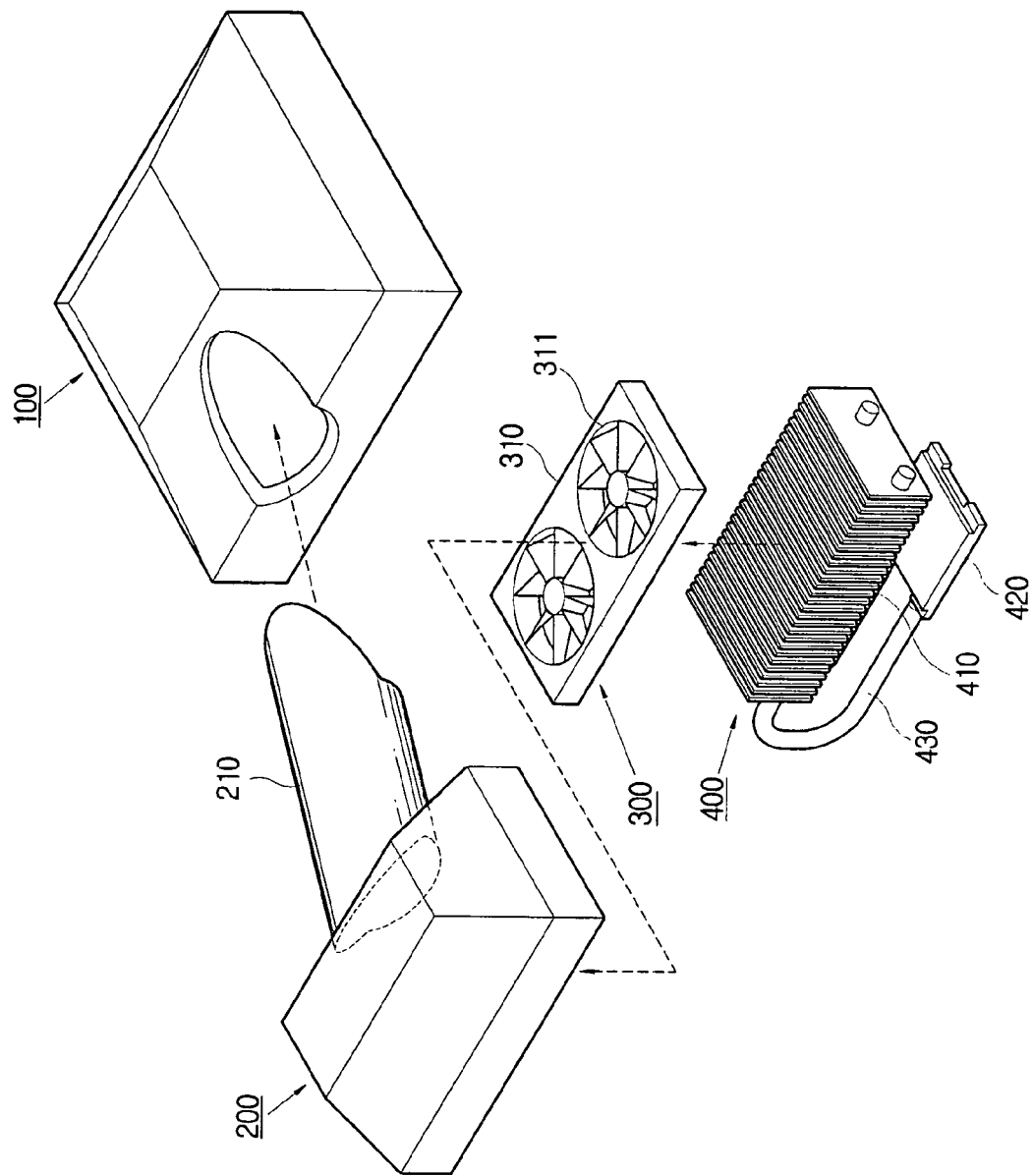
FIG. 1 is an exploded perspective view of a cooling device according to an embodiment of the present invention.

Reference will now be made in detail to the embodiment of the present invention, examples of which are illustrated in the accompanying drawings, wherein like reference numerals refer to like elements throughout. The embodiment is described below in order to explain the present invention by referring to the figures.

Figure 2:
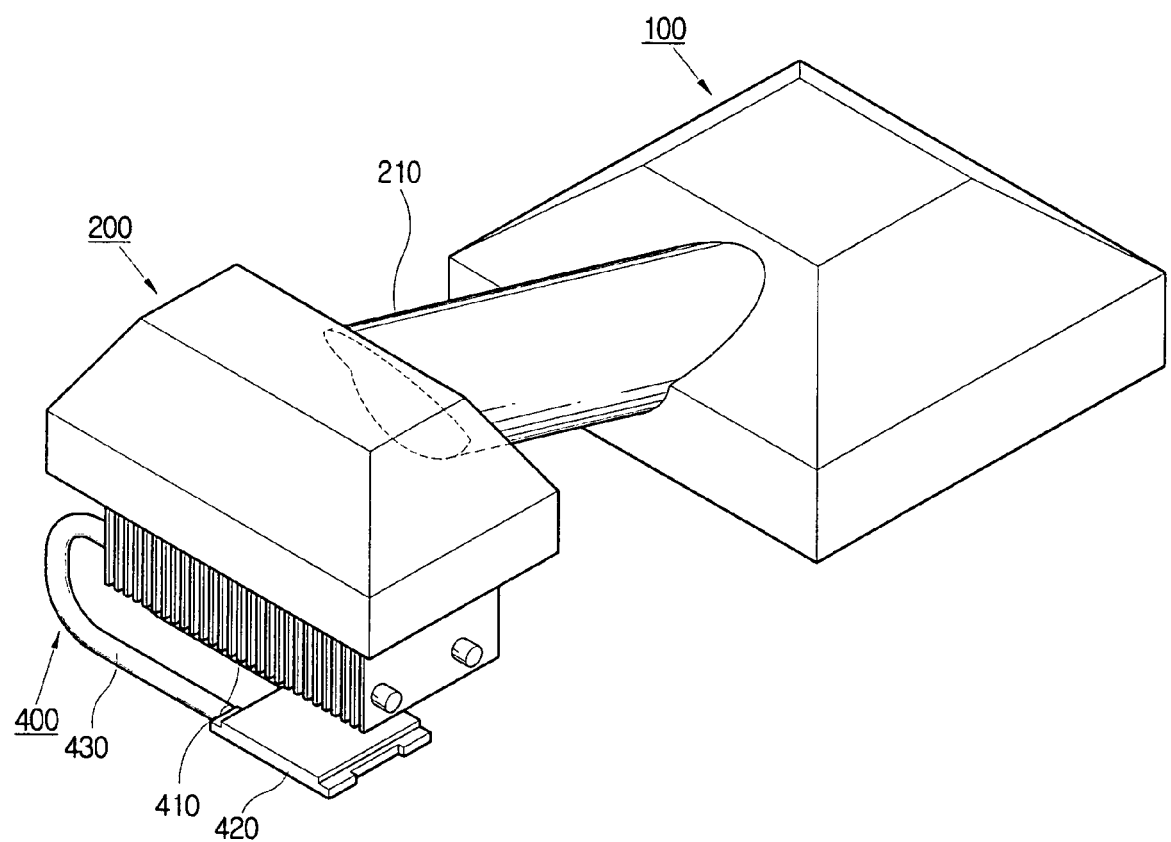
FIG. 2 is a perspective view showing a coupling process of the cooling device of FIG. 1.

FIG. 1 is an exploded perspective view of a cooling device according to an embodiment of the present invention, and FIG. 2 is a perspective view showing a coupling process of the cooling device of FIG. 1.

With reference to FIGS. 1 and 2, an inhaling member 100 inhales (draws) air to be heated by heat generated from a component of an electric or electronic apparatus, e.g., a computer. There is no limit in a shape of the inhaling member 100, that is, the inhaling member 100 may be circular, rectangular and so on, so as to inhale the air disposed around the component. It is possible that the inhaling member 100 is positioned adjacent to a heating element such as a CPU. Alternatively, the inhaling member 100 may be installed toward any space inside a main body of the computer. In addition, a plurality of inhaling members 100 may be installed on a plurality of positions including a heating position disposed adjacent to the heating element, like arms of an octopus.

The air flowing into the inhaling member 100 activates a fan 300 mounted adjacent to an exhausting member 200, so that the air is forcibly moved to the exhausting member 200 from the inhaling member 100. Since the fan 300 forcibly draws the air, a coupling part 210 extended from the exhausting member 200 may be coupled to an inlet formed at any position of the inhaling member 100.

Figure 3:
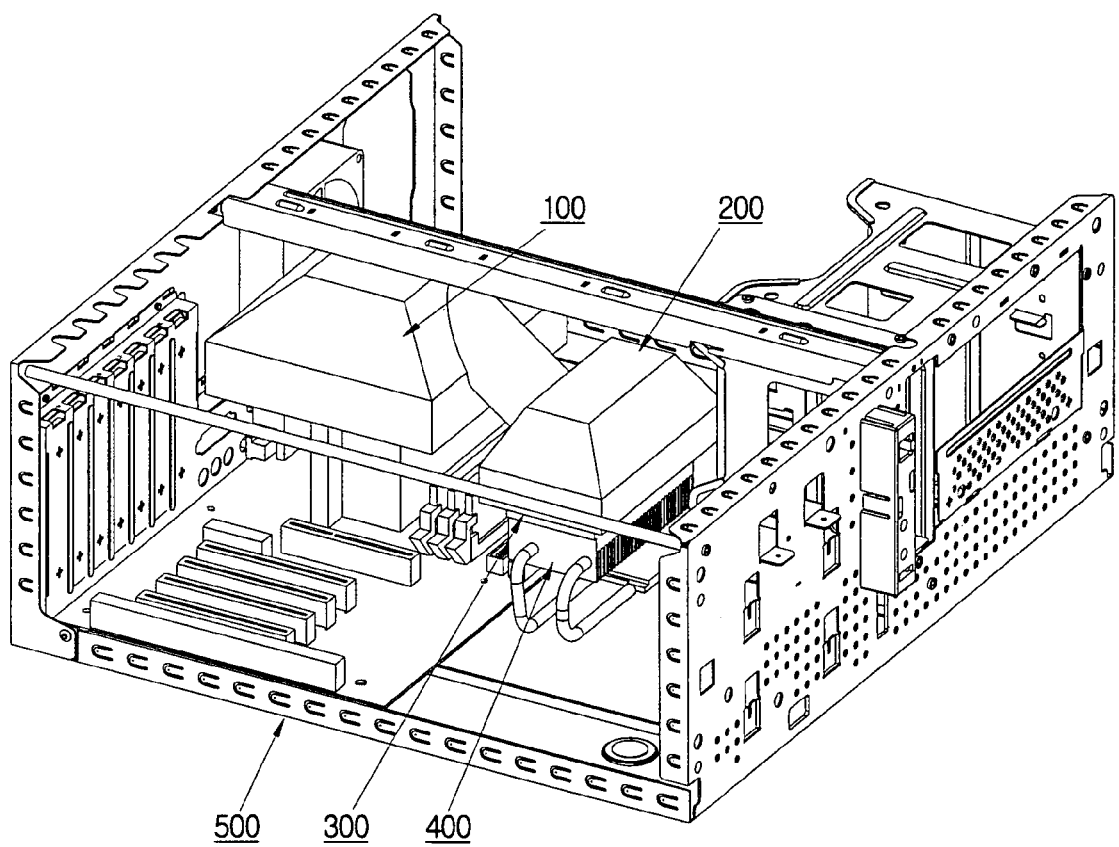
FIG. 3 is a perspective view of a computer main body mounted with the cooling device shown in FIGS. 1 and 2.

As shown in FIGS. 2 and 3, in order to more effectively move the air to be collected into the inhaling member 100, it is possible that an upper side of the inhaling member 100 is wider than a lower side thereof in shape. However, in the shape of the inhaling member 100, a width of the upper side thereof may be equal to or different from that of the lower side thereof because the air is forcibly convected by the fan 300.

The exhausting member 200 can also have one of a variety of shapes. However, since a plurality of heat absorbing fins 410 of a heat exchanger 400 are installed adjacent to the exhausting member 200, it is possible that one side of the exhausting member 200 may have a shape corresponding to the heat absorbing fins 410. Thus, the air heated is allowed to pass through the heat absorbing fins 410, thereby enhancing an efficiency of heat exchange in the cooling device.

The exhausting member 200 communicates with the inhaling member 100 by the coupling part 210, to draw in the heated air flowing into the inhaling member 100. The coupling part 210 extended from the exhausting member 200 to the inhaling member 100 has no limit in shape, length, etc.

The fan 300 forcibly moves the heated air at the heating position through the inhaling member 100 toward the exhausting member 200. The forcible movement of the heated air through the fan 300 makes it unnecessary to provide other cooling fans on the heating element, such as the CPU, and a body casing shown in a conventional apparatus. Therefore, generation of noises due to the conventional cooling fans can be prevented.

The fan 300 is installed adjacent to the exhausting member 200. To prevent noise transmission due to an operation of the fan 300, the fan 300 is mounted inside the exhausting member 200. The fan 300 may be rotated at a high speed to draw any necessary amount of the heated air. However, in an effort to prevent the noises due to a high speed rotation of the fan 300 as shown in FIGS. 1 and 2, about two fans 300 are installed, so as to draw a desired amount of the heated air even though the fan 300 is rotated at a low speed.

In a case where the fans 300 are installed, it is possible to include an accommodating member 310 formed with a seating part 311 accommodating the fans 300. However, the fan 300 may be mounted in the exhausting member 200 without the accommodating member 310.

Where the accommodating member 310 is included, the fans 300 are seated in the accommodating member 310 having the seating part 311, and then the accommodating member 310 mounted with the fans 300 can be installed in the computer during an assembling process.

The heat exchanger 400 includes the heat absorbing fins 410, a heat discharging plate 420, and a refrigerant pipe 430.

It is possible that, the heat absorbing fins 410 are so shaped as to have a wide surface area to facilitate the heat exchange. To widen the surface area, the heat absorbing fin 410 is provided in plural.

The refrigerant is filled inside the heat exchanger 400. The heat exchange between the refrigerant and the air is made by the heat absorbing fins 410. Heat is transferred from the heated air having a relatively higher temperature to the refrigerant having a lower temperature.

The heat discharging plate 420 discharges the heat transferred by the refrigerant from the air. Since the heat exchange is also generated by the heat discharging plate 420, the wider the surface area of the heat discharging plate 420 is, the more advantageous the heat exchange is.

In the cooling device, the heat discharging plate 420 does not directly contact air surrounding the computer but makes the heat exchange with the surrounding air through the body casing 500. A contact surface of the discharging plate 420 for the heat exchange is actually widened to a width of the body casing 500. Therefore, there is no need that the surface area of the heat discharging plate 420 itself is excessively widened.

The refrigerant pipe 430 connects the heat absorbing fins 410 and the heat discharging plate 420. The refrigerant makes the heat exchange by a natural convection between the heat absorbing fins 410 and the heat discharging plate 420 through the refrigerant pipe 430.

To the body casing 500 is attached the heat discharging plate 420 of the heat exchanger 400.

The heat of the heat discharging plate 420 having a higher temperature is transferred to the body casing 500 having a relatively lower temperature. The body casing 500 is still large in surface area compared with the heat discharging plate 420, and thus, a cooling efficiency of the heat exchanger 400 can be enhanced.

To enhance the cooling efficiency by increasing the surface area, a surface of the body casing 500 is shaped like folds or a serrated surface.

It is possible that the body casing 500 is made of a material having a high thermal conductivity. A conventionally widely used metallic material may be used for the body casing 500.

In the cooling device, some effects of the present invention can be accomplished with the use of the body casing 500 formed with a ventilating opening. It is possible that the body casing 500 having a closed shape (structure) 500 would interrupt transmission of the noise from the inside of the main body to the outside and prevent an inflow of outside dust into the inside of the main body.

FIG. 3 illustrates the main body of the computer on which the cooling device shown in FIGS. 1 and 2 is mounted.

Hereinafter, a process of cooling the main body of the computer with the above-described configuration according to the present invention will be described with reference to FIG. 3.

The heat is generated when the heating element, such as the CPU, operates. This heat is discharged through a heat sink mounted on the CPU. The temperature of the air surrounding the heat sink is increased by the heat discharged from the heat sink.

The heat absorbing member 100 is installed adjacent to the heat sink. If the fan 300 is activated, the heated (hot) air flows into the inhaling member 100 and is forcibly moved to the exhausting member 200.

The heated air reaching the exhausting member 200 is moved to the heat absorbing fins 410 of the heat exchanger 400 by the fan 300. As an example, about two fans 300 are operated. The necessary amount of the air can be obtained using the fans 300 even with the rotation thereof at relatively low speed compared with a single fan 300. Therefore, generation of the noise due to the high speed rotation of the fans 300 can be prevented. Additionally, since the fans 300 are mounted inside the exhausting member 200, the noise transmission of the fans 300 due to the low speed rotation can be further interrupted.

The heated air makes the heat exchange with the refrigerant filled inside the heat absorbing fins 410, by passing through the heat absorbing fins 410. The heat from the heated air having a high temperature is transferred to the refrigerant having a relatively low temperature.

The heated air is cooled through the heat exchange, and the cooled air is dispersed again inside the main body. The cooled air lowers an average temperature of the inside of the main body by circulating the inside of the main body. Then, the cooled air is heated and the heated air is again forcibly drawn into the inhaling member 100 and the exhaling member 200 by the fan 300.

The refrigerant heated by the heat exchange is moved into the heat discharging plate 420 through the refrigerant pipe 430. Since the heat discharging plate 420 is attached to the body casing 500, the heat of the refrigerant is transferred to the body casing 500 having the relatively lower temperature. The heat of the body casing 500 is transferred to the air surrounding the main body having the relatively lower temperature. Here, since the surface area of the body casing 500 is still wide compared with the heat discharging plate 420, the heat exchange through the body casing 500 is more effective.

With this configuration, the cooling device according to the present invention can discharge the inside air of the electric or electronic apparatus and forcibly circulate the cooled air without the inflow of the outside air, thereby accomplishing effective cooling.

As described above, with the cooling device according to the present invention, the following effects can be provided.

First, the cooling efficiency is enhanced. Conventionally, the heat is merely dispersed to around positions inside the main body by the cooling fan directly mounted on the heating element, thereby continuously increasing the average temperature of the inside of the main body. However, according to the present invention, the heat inside the main body can be effectively discharged outside. Further, in a case of using the closed body casing, there is no need to provide for the inflow of the outside air, thereby enhancing the cooling efficiency.

Second, the noise is prevented. Conventionally, the noise is severe because of the high speed rotation of the cooling fan. In addition, the body casing is structured to transmit the noise outside through ventilating opening thereon. However, according to the present invention, the low speed rotation is allowed with the use of the fans, and the fans are installed inside the exhausting member, thereby interrupting the noise. Also, with the use of the closed body casing, a variety of noises inside the main body can be prevented.

Third, the inflow of the dust is prevented. Conventionally, a cooling fan is installed on the body casing and a ventilating opening is formed thereon, and thus, the inflow of the dust through the ventilating opening has been severe. However, according to the present invention, since the body casing is the closed structure, the inflow of the dust can be inherently prevented.

Although an embodiment of the present invention have been shown and described, it will be appreciated by those skilled in the art that changes may be made in the embodiment without departing from the principles and spirit of the invention, the scope of which is defined in the appended claims and their equivalents.

What is claimed is:

1. A cooling device for an electric or electronic apparatus having a body casing containing a component generating heat, comprising:
   an inhaling member drawing air and then discharging the air heated by the heat generated from the component of the electric or electronic apparatus;
   an exhausting member communicating with the inhaling member to receive the heated air from the inhaling member and then discharge the heated air;
   a fan provided adjacent to the exhausting member to forcibly draw the heated air from the exhausting member and discharge the heated air; and
   a heat exchanger absorbing the heat from the heated air discharged from the fan, and discharging the heat through the body casing of the electric or electronic apparatus.

2. The cooling device according to claim 1, wherein the fan comprises:
   an accommodating member formed with a seating part accommodating the fan.

3. The cooling device according to claim 1, wherein the heat exchanger comprises:
   a plurality of heat absorbing fins;
   a refrigerant filled inside the heat exchanger to make a heat exchange with the heated air passing through the heat absorbing fins;
   a heat discharging plate attached to the body casing of the electric or electronic apparatus to discharge a heat energy of the refrigerant received from the heated air; and
   a refrigerant pipe connecting the heat absorbing fins and the heat discharging plate to allow the refrigerant to circulate the heat exchanger.

4. An electric or electronic apparatus having a component generating heat, comprising:
   a cooling device comprising:

an inhaling member drawing air and then discharging the air heated by the heat generated from the component of the electric or electronic apparatus, an exhausting member communicating with the inhaling member to receive the heated air from the inhaling member and then discharge the heated air, a fan provided adjacent to the exhausting member to forcibly draw the heated air from the exhausting member and discharge the heated air, and a heat exchanger absorbing the heat from the heated air discharged from the fan; and a body casing on which the cooling device is mounted, in which the component is disposed, and through which the heat is discharged from the heat exchanger.

5. The apparatus according to claim 4, wherein the body casing is structured so as to be closed from an outside of the apparatus.

6. The apparatus according to claim 4, wherein the fan of the cooling device comprises:

an accommodating member formed with a seating part accommodating the fan.

7. The apparatus according to claim 6, wherein the body casing is structured to be closed from an outside of the apparatus.

8. The apparatus according to claim 4, wherein the heat exchanger comprises:

a plurality of heat absorbing fins;

a refrigerant filled inside the heat exchanger to make a heat exchange with the heated air passing through the heat absorbing fins;

a heat discharging plate attached to the body casing of the electric or electronic apparatus to discharge a heat energy of the refrigerant received from the heated air; and a refrigerant pipe connecting the heat absorbing fins and the heat discharging plate to allow the refrigerant to circulate the heat exchanger.

9. The apparatus according to claim 8, wherein the body casing is structured so as to be closed from an outside of the apparatus.

10. An apparatus having a component generating heat in a computer, comprising:

a body casing having an inside surface forming an inside containing the component inside thereof; and a cooling device mounted on the inside surface of the body casing, the cooling device comprising:

an inhaling member drawing air heated by the heat of the component in the inside of the body casing, an exhausting member communicating with the inhaling member to receive the heated air from the inhaling member, a fan forcibly drawing the heated air from the inhaling member through the exhausting member, and discharging the heated air into the inside of the body casing, and a heat exchanger absorbing the heat from the heated air discharged from the fan, and discharging the heat through the inside surface of the body casing.

11. The apparatus of claim 10, wherein the component is disposed on a first portion of the inside surface of the body casing, and the heat exchange is mounted on a second portion of the inside surface of the body casing.

12. The apparatus of claim 10, wherein the inhaling member is disposed above the component to collect the heated air heated by the heat generated from the component.

13. The apparatus of claim 10, wherein the inhaling member comprises:

an inlet having an inlet area corresponding to an outer surface of the component in a direction parallel to the inside surface of the body casing to collect the heated air.

14. The apparatus of claim 13, wherein the inhaling member comprises:

an outlet having an outlet area smaller than the inlet area, and coupled to the exhaling member.

15. The apparatus of claim 10, wherein the exhausting member comprises:

an inlet having an inlet area to communicate with the inhaling member;

an outlet having an outlet area larger than the inlet area to communicate with the heat exchanger.

16. The apparatus of claim 15, wherein the outlet area of the outlet of the exhausting member corresponds to an outer surface of the heat exchanger in a direction parallel to the inside surface of the body casing.

17. The apparatus of claim 15, wherein the outlet of the exhausting member is disposed above the heat exchanger to discharge the heated air toward the heat exchanger.

18. The apparatus of claim 15, wherein the exhausting member comprises an inner surface, and the fan is mounted on the inner surface of the exhausting member.

19. The apparatus of claim 10, wherein the exhausting member comprises a coupling part coupled between the inhaling member and the exhausting member, the coupling member comprises a first portion connected to the inhaling member and a second portion connected to the exhausting member, and the second portion of the coupling member is spaced apart from the inside surface of the body casing by a first distance while the first portion of the coupling member is spaced-apart from the inside surface of the body casing by a second distance smaller than the first surface.

20. The apparatus of claim 10, wherein the heat exchanger comprises:

a heat absorbing fin contacting the heated air discharged from the fan to absorb the heat from the heated air;

a heat discharging plate attached to the inside surface of the body casing to discharge the heat received from the heat absorbing fin;

a refrigerant pipe connecting the heat absorbing fin to the heat discharging plate; and a refrigerant filled inside the heat absorbing fin, heat discharging plate and the refrigerant to make a heat exchange.

21. The apparatus of claim 20, wherein the exhausting member is disposed above the heat absorbing fin, and the heat absorbing fin is disposed above the heat discharging plate.

22. The apparatus of claim 10, wherein the inhaling member and the component are disposed on a first portion of the inside surface of the body casing, and the exhausting member and the heat exchanger are disposed on a second portion of the inside surface of the body casing.

23. The apparatus of claim 10, wherein the exhausting member comprises a coupling member disposed between the first portion and the second portion to couple the inhaling member to the exhausting member.

* * * * *

UNITED STATES PATENT AND TRADEMARK OFFICE
CERTIFICATE OF CORRECTION

PATENT NO. : 7,023,696 B2 Page 1 of 1
APPLICATION NO. : 10/688915
DATED : April 4, 2006
INVENTOR(S) : Sung-soo Ko It is certified that error appears in the above-identified patent and that said Letters Patent is hereby corrected as shown below:

On the Title page, item (73) Assignee, change "Electcronics" to --Electronics--

Signed and Sealed this

Seventeenth Day of October, 2006

JON W. DUDAS
*Director of the United States Patent and Trademark Office*